United States Patent [19]
Walker et al.

[11] Patent Number: 5,179,314
[45] Date of Patent: Jan. 12, 1993

[54] NON-SEQUENTIAL RASTER SCANNING APPARATUS AND METHOD

[76] Inventors: David L. Walker, 731 Puma Canyon La., Glendora, Calif. 91740; Steven A. Spears, 1569 Calle Ciervos, San Dimas, Calif. 91773

[21] Appl. No.: 585,330

[22] Filed: Sep. 19, 1990

[51] Int. Cl.⁵ ............................................. H01J 31/26
[52] U.S. Cl. ..................................... 315/10; 358/216
[58] Field of Search ................. 315/10; 358/216, 214, 358/69

[56] References Cited

U.S. PATENT DOCUMENTS

| | | | |
|---|---|---|---|
| 4,746,985 | 5/1988 | Waldron et al. | 358/216 |
| 4,823,204 | 4/1989 | Holland | 358/216 |

Primary Examiner—Theodore M. Blum

[57] ABSTRACT

A cathode ray tube non-sequential raster scanning method maintains a more uniform screen luminescence. This raster scanning method scans and stores electrical signals representing the locations of non-sequential blocks of adjacent raster lines or reordered individual raster lines from a cathode ray tube in a temporary storage apparatus. A programmable controller associated with the cathode ray tube and the temporary storage apparatus reorders the stored raster line location and selectively deflects the cathode ray beam. Analog or digital film-to-video transfer systems incorporating a cathode ray tube having non-sequential raster scanning are also described. A method of variable raster scanning for a weave correcting film-to-video transfer system is also disclosed.

13 Claims, 2 Drawing Sheets

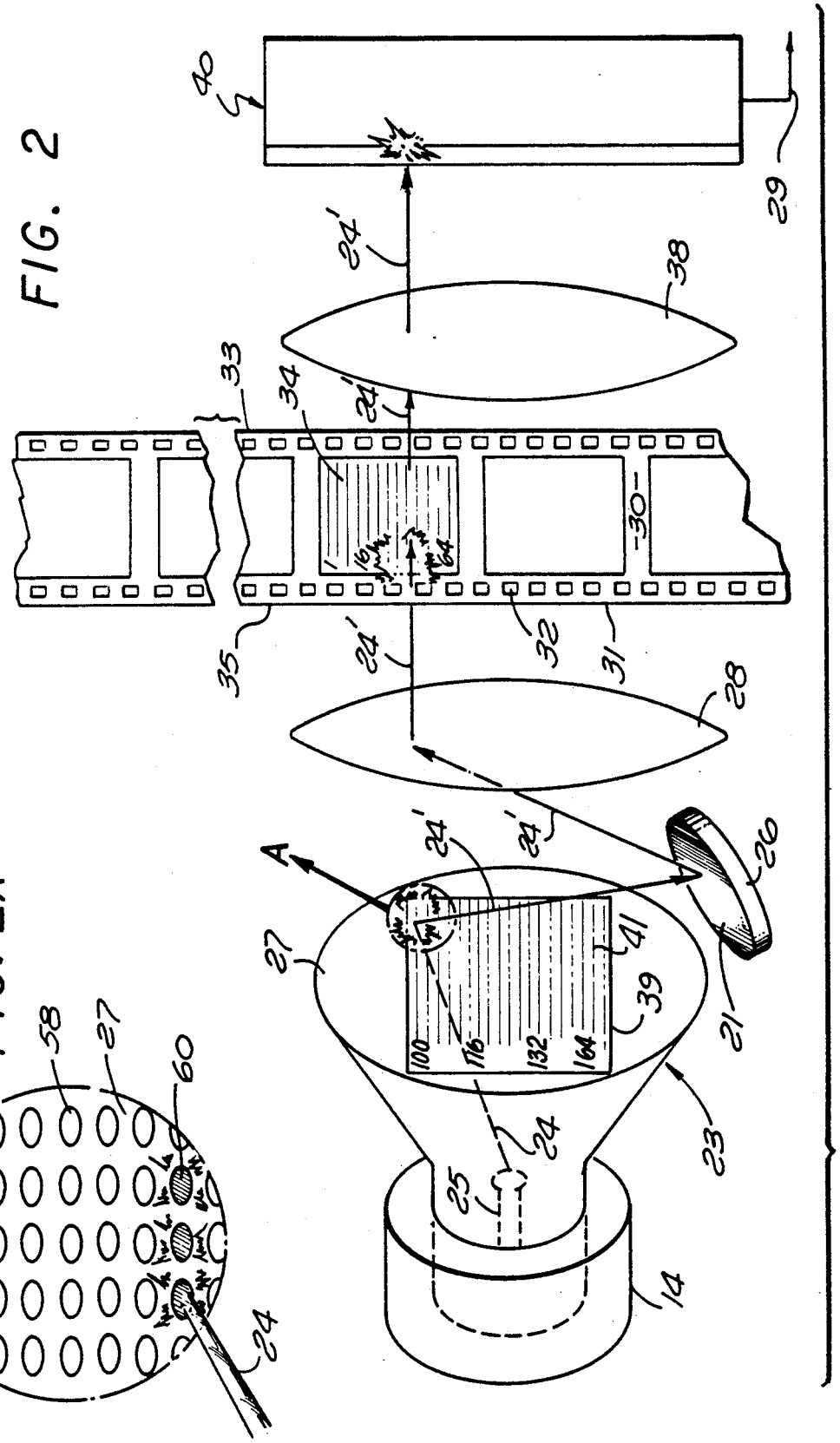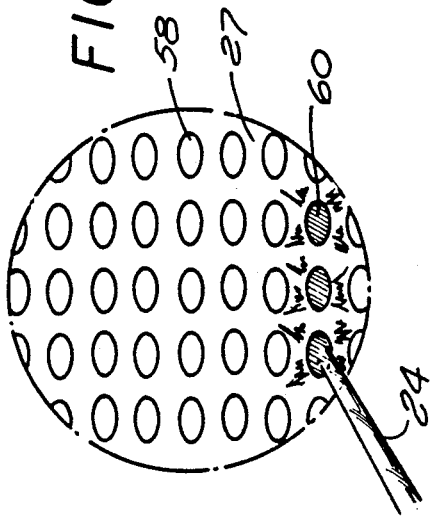

NON-SEQUENTIAL RASTER SCANNING APPARATUS AND METHOD

BACKGROUND OF THE INVENTION

The present invention relates to a non-sequential raster scanning method, and more particularly to a method useable with a cathode ray tube (CRT) to maintain a more uniform screen light intensity during the scanning function.

A cathode ray tube (CRT) consists of an evacuated glass tube having a flat screen area treated by a uniform layer of unexcited phosphorous. An electron gun producing a deflectable electron beam shoots electrons toward the phosphorous treated screen. When the phosphorous atoms which coat the interior surface of the screen are struck by the electron beam, they become excited and emit visible light glowing on the screen surface. If the electron beam is continuously scanned in a linear fashion upon the CRT screen, the glowing phosphorous atoms produce a raster line visible on the CRT screen surface. A vertical series of adjacent horizontal raster lines appear as a rectangular glowing raster scan of the generally circular CRT screen.

The ability of the CRT raster scan to glow to a level of brightness depends upon the size of the raster scan area.

When a limited CRT screen area is repeatedly scanned by the electron beam heat buildup or thermal changes affect the phosphorous coating the interior surface of the CRT. Phosphorous experiencing thermal changes emit light inefficiently.

For example, when a CRT is used in a film-to-video transfer apparatus like a telecine, the size of raster scan on the CRT screen surface adjusts to compensate for velocity changes of the film being transferred past the CRT. Increased film scanning speed generally produces a decrease in the raster scan size and a detrimental change in the efficiency of the light producing phosphorous.

Normal raster scan is performed during the transfer of a film image to a video signal. If raster scan is interrupted, to perform film weave correction as disclosed in U.S. patent application Ser. No. 07/502,472, filed Mar. 30, 1990 entitled "Real Time Registration Weave Correction System", the electron beam may return to a CRT screen area previously illuminated or a screen area where adjacent scanning has occurred. Adjacent raster lines scanned numerous times over a short period of time produces heat buildup and thermal changes which reduce the efficiency of the phosphorous. The decrease in efficiency of the phosphorous causes the phosphorus to glow more dimly affecting the light level of the transferred video image.

Continued raster size decrease or long-term adjacent energizing of a small, localized screen area, also burns a patch into the phosphorous. This patch is an area of decreased phosphorus efficiency and appears more dim than the rest of the raster scan.

Another scanning problem occurs during scan tracking in the transfer of film to video using a telecine. Phosphorous grain size becomes very large exposing blemishes in the transferred film being scanned producing a shadowy, web-like haze over the resultant transferred video picture.

SUMMARY OF THE INVENTION

The present invention, a non-sequential raster scanning apparatus and method, maintains a more uniform illumination of the cathode ray tube screen surface. Non-sequential scanning of individual raster lines limits the electron energy localized on the CRT screen which increases the phosphorous atoms illumination efficiency and avoids a dim CRT screen.

The raster scanning apparatus includes an electron beam scanning device for selectively energizing raster lines of glowing phosphorus on a CRT screen, a detector which detects the intensity of the energized glowing phosphorous atoms and generates electrical signals corresponding to their location, a temporary storage device to receive and store the electrical signals and a programmable controller interconnected to the electron beam scanning device and the temporary storage device which reorders the stored electrical signals and deflects the electron beam scanning device in a scanning sequence.

A non-sequential raster scanning method includes the steps of; deflecting the electron beam of a CRT in a controlled, linear order energizing phosphorus atoms to a predetermined level, detecting the intensity of these energized phosphorous atoms with a photo detector which generates signals corresponding to the detection of the film modulated emitted light, storing the signals generated by the photo-detectors in a temporary storage means, reordering the stored signals in a sequential order and repeating these steps until an entire raster scan is complete.

One raster scanning method called reverse block scanning scans in reverse for a series of lines, jumps forward and scans the lines in between to previously reverse scanned lines and repeats the process.

An alternative raster scanning method scans random non-adjacent raster lines, stores them in a non-sequential order, and then reorders them into their proper sequence.

A scanning film-to-video transfer apparatus incorporating a cathode ray tube having a variable raster scanning capability is also disclosed.

An analog raster scanning film-to-video transfer apparatus operates using analog signals and a temporary storage means of charge couple device (CCD) delay lines under the direction of a controller.

A digital raster scanning film-to-video transfer system operates with digital signals stored in a random access memory (RAM) and a controller.

BRIEF DESCRIPTION OF THE DRAWINGS

A complete understanding of the present invention and the above advantages may be gained from a consideration of the following description of the preferred embodiments taken in conjunction with the accompanying drawings in which:

FIG. 2 with an insert A, is a schematic representation of a cathode ray tube performing raster scanning as incorporated within a film-to-video transfer system; and FIG. 2A is a schematic representation of the interior surface of a CRT screen with an electron beam scanning phosphorous deposited on the CRT.

DETAILED DESCRIPTION

Figure 1:
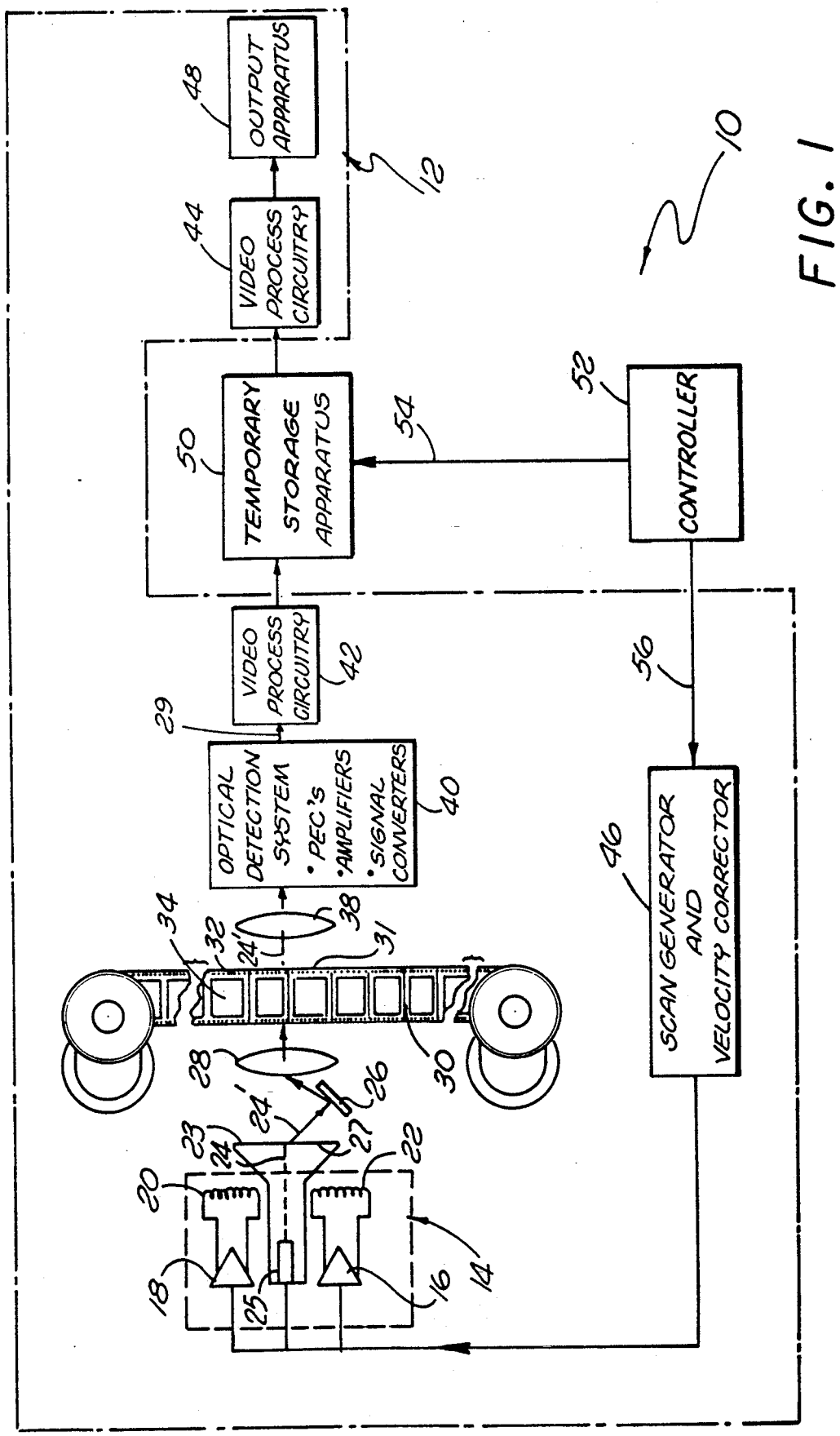
FIG. 1 is a schematic representation of a film-to-video transfer system incorporating a cathode ray tube raster scanning method.

A cathode ray tube (CRT) raster scanning method, maintains uniform light intensity output of energized phosphorous when a cathode ray tube is subjected to scanning changes such as film transport speed or scanning interruption. This method includes electrical signal data storage in a temporary storage memory and manipulation of the non-sequentially stored data, analog or digital, by a controller.

The CRT non-sequential raster scanning method performs reverse block scanning when predetermined, alternating blocks of adjacent illuminated film lines are scanned, converted to analog or digital signals, stored in the temporary storage means, and then reconfigured and reordered using a controller into their proper sequential order.

An alternative method alternately scans random, non-sequential alternate lines, converts them to data which are temporarily stored and reordered into their proper sequence.

A film-to-video transfer system such as a telecine incorporating this non-sequential raster scanning method provides a more uniformly bright CRT screen when film speed varies or weave correction and normal raster scanning is interrupted.

The CRT raster scanning method enables a cathode ray tube screen to maintain a more uniform light intensity and resolves problems generated when the raster scan size is significantly reduced during the scanning process.

Increasing the scanned picture area through raster scanning reduces the magnification of transferred picture grain preventing a web-like visual effect when a telecine transfers a film image to a video signal using a CRT.

Finally, non-sequential scanning reduces the likelihood of the permanent "phosphorous burn" and increases CRT life.

FIG. 1 is a schematic representation of a CRT non-sequential raster scanning incorporated into a film-to-video transfer system such as a telecine. One example of a telecine is the telecine described in the patent to David E Holland, U.S. Pat. No. 4,823,204 issued Apr. 18, 1989, entitled "Method and Apparatus for Film Weave Correction." The film-to-video transfer system 10 incorporates telecine 12, temporary storage apparatus 50 and controller 52.

In a standard telecine 12 as shown in FIG. 1, a high-powered deflection system 14 deflects an electron beam 24 generated by an electron gun 25 in cathode ray tube 23. The electron beam 24 is deflected across the interior surface of the screen 27 of the cathode ray tube 23. The screen 27 has uniformly deposited across the screen 22, a layer of phosphorous atoms. When the phosphorous atoms are unexcited by the electron beam 24, they do not emit visible light. When the phosphorous is struck by the electron beam 24, the phosphorous is excited and generates visible light which causes CRT screen 27 to glow. The interior surface of the CRT screen 27 is mapped providing the exact location of the glowing screen using an x-y coordinate system. Deflection of the electron beam in the x or y direction is controlled by the high powered deflection system 14. The high-powered deflection system 14 incorporates x axis coil 22 and y axis coil 20 which are both controlled by amplified electrical signals received from x axis scanning amplifier 16 and y axis scanning amplifier 18, respectively. Amplifiers 16 and 18 receive the x and y control signals from the scan generator and velocity corrector 46 along signal bus 56.

In this example, electron beam 24 is deflected by the deflection system 14 excites phosphorous producing emitted light beam 24'. The light beam 24' emitted from the CRT 23, in this embodiment, strikes optional mirror 26 and is focused through first lens 28.

The sequential deflection of the electron beam 24 across the CRT screen 27 produces over time a raster scan on the screen 27. Light beam 24' emitted from the CRT 23 consequently scans across a strip of moving film 30 in direct response to the electron beam 24. The moving film strip 30 includes individual film frames 34 and sprockets 32 and edge 31. The sequentially deflected light beam 24' scanning individual film frames 34 passes through the back side of the film strip 30 through second lens 38. This light beam 24' passing through second lens 38 is detected by optical detection system 40. Optical detection system 40 is a component of the standard telecine 12.

In this example, optical detection system 40 incorporates photoelectric cells which generate electrical signals 29 in response to the detected light beam 24'. These electrical signals 29 are amplified by amplifiers located within optical detection system 40 and optional analog to digital converters, convert the amplified analog to digital electrical signals 29 for a digital system. The analog or digital electrical signal 29 is processed by existing video processing circuitry 42 within the telecine 12.

The present invention, a film-to-video transfer system 10 shown in FIG. 1, includes a CRT raster scanning apparatus. The analog or digital electrical signal 29 processed through existing telecine video circuitry 42, enters a temporary storage apparatus 50. In an analog film transfer system, the temporary storage apparatus 50 is a series of charge couple device (CCD) delay lines. A digital film-to-video transfer system, with digital signal 29 produced by optical detection system 40 to store digital information in the temporary storage apparatus 50, is a random access memory (RAM) chip.

Electrical signals 29 either analog or digital, stored in temporary storage apparatus 50 are manipulated by controller 52. Addresses describing the location of the light beam 24' detected by photodetectors in the optical detection system 40 are assigned to the electrical signals 29 stored in the temporary storage apparatus 50. These signals 29 are stored in a non-sequential order. Controller 52 reorders the non-sequentially scanned stored signals 29 into a predetermined sequential order using established programs. The controller 52, is further programmed to deflect the electron beam 24 using deflection signal on bus 56 to the deflection system 14. Scan generator and velocity corrector 46 determines what area of the CRT screen is scanned while controller 52 determines the scanning sequence. Scan generator and velocity corrector 46 also provide velocity correction of the deflected electron beam 24 to correct for film movement. Controller 52 provides non-sequential raster line scanning through the preprogrammed manipulation of temporarily stored data preventing energization of a small area of the screen 27 of the cathode ray tube 23 as the area size scanned, decreases.

Controller 52 is programmed to determine on an instantaneous basis what raster line is scanned, what direction the electron beam 24 scan is in. Controller 52 is also programmed to reorder what has been previously scanned after it has been scanned in a non-sequential order. This controller means 52 can be for example, a programmable read only memory (PROM) or similar computer programmable hardware.

Output apparatus 48 shown as part of the telecine 12 could be, for example, signals to be fed to a color monitor or an electrical signal used to produce a video tape.

FIG. 2 is a schematic representation of a cathode ray tube as used in a film-to-video transfer system. In FIG. 2, the cathode ray tube 23 includes a screen surface 27 which has a coating of phosphorous on its interior surface. The phosphorous atoms are excited when exposed to electron beam 24 produced by electron gun 25. Deflection system 14 deflects electron beam 24 generated by electron gun 25 producing a raster scan 39 across the interior surface of the CRT screen 27. Raster scan 39 as shown in this example, is generally rectangular while the CRT screen 27 is circular in configuration. The light beam 24' generated by the glowing, excited phosphorous atoms on the interior surface of the CRT screen 27, strikes optional surface 21 of mirror 26. Light beam 24' is deflected by mirror 26 striking lens 28 where beam 24' is focused by first lens 28 upon the front surface 35 of film strip 30 having individual film frames 34. When the deflected, focused light beam 24' scans across and passes through film frames 34, the light beam 24' enters second lens 38 where the light beam 24' is focused upon optical detection system 40.

Raster scan area 39, shown in FIG. 2 is a horizontal series of excited phosphorous atoms forming individual raster lines 41. During normal raster scan 39, these lines 41 are scanned sequentially as the film strip 30 passes between the first lens 28 and second lens 38. If the film strip 30 processing speed is increased, the physical size of the raster scan 39 changes, usually becoming smaller and dependant upon the specific area scanned. A decrease in the raster scan 29 size means the same amount of electron beam 24 energy is localized in a smaller area. Thermal effects are generated by heat build up in these small, local energized areas causing the phosphorous atoms to lose their light producing efficiency. When phosphorous atoms burn with decreased energy, the sequentially scanned screen 27 dims in that area.

The energization of individual raster lines 41 in a non-sequential order energizes the interior surface of the CRT screen 27 while limiting thermal change due to overly energized phosphorous atoms.

Non-sequential raster scanning is directed by the controller 52 through the scan generator 46 scanning predetermined blocks of sequential raster lines 41 backwards while scanning the overall raster scan 39 in a predominantly forward manner. Reverse block scanning scans in reverse for a series of lines, jumps forward and scans the lines in between to previously reversed scanned areas. This non-sequential, intermittent block scanning prevents heat buildup of a small area of the CRT.

For example, as shown in FIG. 2, during raster scan 39, the controller 52 directs the deflection system 14 to deflect the electron beam 24 to raster line 41 known as address 132 and scans backwards to raster address line 100. Then the controller 52 directs the deflection system 14 deflect to raster line address 164 and scan to line 133. The controller 52 maintains the electron beam 24 in a predominantly forward scanning direction while avoiding sequential raster line scanning.

An alternative scanning method is the non-sequential scanning of individually selected raster lines 41. For example, the controller 52 is programmed to have the high power deflection system 14 deflect the electron beam 24 to raster scan lines addressed as 100, 105, 116 and 132. Then the controller 52 deflects the beam 24 to scan lines 102, 106, 117 and 133. The photodetectors within the optical detection system 40 detects the scanned lines and generates signals 29 representative of the address locations for storage in the temporary storage apparatus 50 as shown in FIG. 1. The controller 52 is also programmed to reorder the non-sequentially individually scanned lines 41 into a sequential order.

When the film-to-video transfer system 10 includes film weave correction capability, the raster scan 29 is interrupted during sequential raster line 41 scanning to cross the edge of sprocket hole 32 of film strip 30. This interruption in normal, consecutive scanning and subsequent return to normal, consecutive raster line scanning often causes scanning of the same or an adjacent CRT screen area. Energization of a limited screen 27 area is also a frequent result. Therefore, raster line 41 scanning in a sequential, uniform order disrupted during weave scan correction for a telecine performing film-to-video transfer, produces a thermal change when the screen 27 area previously scanned is immediately rescanned after weave correction due to film velocity. Non-sequential, raster line scanning during the normal scan prevents this thermal change. The phosphorous efficiency is maintained and the CRT screen 27 does not dim.

FIG. 2A is a schematic representation of the insert of FIG. 2 showing the interior surface of the CRT screen 27. The interior surface area of the CRT 23 is treated with phosphorous atoms uniformly configured into area 58. The electron beam 24 is of variable width and the areas are struck by electron beam 24 during the scanning process. These areas of phosphorous becomes energized and emit light energy as excited phosphorous area 60.

While particular embodiments of the invention have been shown and described, it will be obvious to those skilled in the art that changes and modifications may be made without departing from the invention in its broader aspects and therefore the aim in the appended claims is to cover all such changes and modifications as followed in the true spirit and scope of the invention.

What is claimed is:

1. A raster scanning digital film-to-video transfer apparatus, comprising:

digital film-to-video transfer means for transferring individual film frames on a moving film strip to video tape using a cathode ray tube selectively energizing raster lines of phosphorus atoms disposed upon the interior surface of the tube;

random access memory storage means cooperatively associated with the digital film-to-video transfer means for storing digital electrical signals corresponding to the location of scanned, raster lines; and programmable read only memory means cooperatively associated with the digital film-to-video transfer means and the random access memory storage means for reordering the stored digital electrical signals corresponding to the locations and deflecting the cathode ray beam in a scanning sequence.

2. A raster scanning analog film-to-video transfer apparatus, comprising:

analog film-to-video transfer means for transferring individual film frames on a moving film strip to video tape using a cathode ray tube selectively energizing raster lines of phosphorus atoms disposed upon the interior surface of the tube;

at least one charge coupled device delay line memory storage means cooperatively associated with the analog film-to-video transfer means for storing analog electrical signals corresponding to the location of scanned, raster lines; and programmable read only memory means cooperatively associated with the analog film-to-video transfer means and the charge coupled device delay line storage means for reordering the stored analog electrical signals corresponding to locations and deflecting the cathode ray beam in a scanning sequence.

3. Method of reducing intensity changes in emitted light from cathode ray tube phosphor caused by localized scanning in a motion picture film-to-video transfer apparatus employing a cathode ray tube to generate a video signal comprised of a plurality of video lines representing film frame images, said method further operable to reduce picture grain and permanent phosphor burn, said method comprising the following:

a) Storing electrical signals representing information on the motion picture film in a temporary storage medium while the cathode ray tube phosphor is scanned in a nonsequential line order;

b) generating a video signal by recalling said electrical signals in said temporary storage in an order to compensate for said non-sequential line order.

4. Method of reducing intensity changes in emitted light from cathode ray tube phosphor caused by localized scanning in a motion picture film-to-video transfer apparatus employing a cathode ray tube to generate a video signal comprised of a plurality of video lines representing film frame images, said method further operable to reduce picture grain and permanent phosphor burn, said method comprising the following:

a) scanning the lines in said film frame image in the direction opposite the direction of the motion of said film and storing the resulting detected film information in a temporary storage medium;

b) after each block is stored recalling said stored film information in the opposite order as stored;

c) repeating steps a) through b) for a plurality of said film frames.

5. Method of reducing changes in emitted light intensity from cathode ray tube phosphor and picture grain caused by localized scanning in a motion picture film image to video signal transfer apparatus employing a cathode ray tube to selectively access information on the film, said method comprising the following:

a) scanning a plurality of blocks of said lines on said film and storing the resulting detected film information in a temporary storage medium, said blocks comprising a plurality of horizontal scan lines advancing vertically between each said horizontal line in the direction opposite of the direction of the motion of said film and advancing vertically between each said block of said lines in the direction of the film to a next block of unscanned lines;

b) recalling in the opposite order as stored said stored film information after each said block is stored;

c) repeating steps a) through b) for a plurality of film frames.

6. Method of claim 5 wherein said cathode ray tube is use to preform wave correction measurements during the period between blocks.

7. Method of reducing changes in emitted light intensity from cathode ray tube phosphor and picture grain caused by localized scanning in a motion picture film image to video signal transfer apparatus employing a cathode ray tube to selectively access information on the film, said method comprising the following steps:

a) scanning the lines in a first scan block in a predetermined pseudo-random non-sequential order and storing the resulting detected film information in a temporary storage medium;

b) advancing in the direction of the film to a next block of lines;

c) scanning the lines in said next scan block in said predetermined pseudo-random non-sequential order and storing the resulting detected film information in a temporary storage medium and recalling the stored film information from the previous block in an order to compensate for said pseudo-random non-sequential order as stored;

d) preforming steps b) through c) as at least one time;

e) recalling the stored film information from the last block scanned in an order to compensate for said pseudo-random non-sequential order as stored;

f) repeating steps a) through e) for a plurality of film frames.

8. Method of reducing changes in emitted light intensity from cathode ray tube phosphor and picture grain caused by localized scanning in a motion picture film image to video signal transfer apparatus employing a cathode ray tube to selectively access information on the film, said method comprising the following:

a) scanning a plurality of blocks of said lines on said film and storing the resulting detected film information in a temporary storage medium; said blocks comprising a plurality of horizontal scan lines moving vertically between each said horizontal line in a predetermined nonsequential substantially random manner and advancing vertically between each said block of said lines in the direction of the film to a next block of unscanned lines;

b) recalling, in an order to compensate for said non-sequential substantially random manner as stored, said stored film information after each said block is stored;

c) repeating steps a) through b) for a plurality of film frames.

9. Method of claim 8 wherein said cathode ray tube is used to preform weave correction measurements during the period between blocks.

10. A film-to-video scanning system employing a cathode ray tube to generate a video signal comprised of a plurality of video lines representing film frame images comprising:

controller means for generating a non-forward-sequential vertical scan signal and a storage signal related to said non-forward-sequential vertical scan signal and further operable to generate a recall signal inversely related to said non-forward-sequential scan signal;

velocity correction means coupled to said controller for generating a vertical deflection signal that is a function of said non-forward-sequential scan signal and the film velocity;

deflection means coupled to said velocity compensation means and responsive to said vertical deflection signal for scanning lines on said cathode ray tube phosphor;

detection means for generating a first video signal representing the intensity of light from said cathode ray tube after said light is modulated by passing through said film;

temporary storage means responsive to said storage signal operable to temporarily store said first video signal, said temporary storage means also responsive to said recall signal, and operable to generate a reordered video signal to compensate for said non-forward-sequential vertical scan.

11. The film-to-video scanning system of claim 10, wherein the scan sequence is randomly selected, non-adjacent raster lines.

12. The film-to-video scanning system of claim 10 wherein the scan sequence reverse scans adjacent raster lines in adjacent blocks.

13. The film-to-video scanning system of claim 10 wherein the scan sequence varies as new film frames are scanned.

* * * * *